United States Patent
Wotzak et al.

(10) Patent No.: US 9,890,846 B2
(45) Date of Patent: Feb. 13, 2018

(54) GEARBOX WITH SEALED ACCESSORY VENT

(71) Applicant: General Electric Company, Schenectady, NY (US)

(72) Inventors: Mark Gregory Wotzak, Brookline, MA (US); Duane Howard Anstead, Fairfield, OH (US); Bojan Lukovic, Liberty Township, OH (US); James John Luz, Tewksbury, MA (US); Thomas Charles McCarthy, Cincinnati, OH (US); Keith Beatty, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 189 days.

(21) Appl. No.: 14/940,269

(22) Filed: Nov. 13, 2015

(65) Prior Publication Data

US 2016/0160992 A1    Jun. 9, 2016

Related U.S. Application Data

(60) Provisional application No. 62/089,025, filed on Dec. 8, 2014.

(51) Int. Cl.
*F16H 57/02* (2012.01)
*F16H 57/04* (2010.01)
(Continued)

(52) U.S. Cl.
CPC ............ *F16H 57/027* (2013.01); *F02C 7/32* (2013.01); *F16H 57/029* (2013.01);
(Continued)

(58) Field of Classification Search
CPC .. F16H 57/027; F16H 57/029; F16H 57/0456; F16H 57/0472; F02C 7/32; F05D 2260/605; F05D 2260/608
See application file for complete search history.

(56) References Cited

U.S. PATENT DOCUMENTS 6,527,276 B1 *   3/2003   Phillips ................... F16C 33/76
                                                                           277/351
7,063,734 B2    6/2006   Latulipe et al.
(Continued)

FOREIGN PATENT DOCUMENTS

| JP | 2001317375 A | 11/2001 |
| JP | 2007530848 A | 11/2007 |
| JP | 2009528468 A | 8/2009 |

OTHER PUBLICATIONS

European Search Report and Opinion issued in connection with corresponding EP Application No. 15196989.6 dated Apr. 28, 2016.
(Continued)

*Primary Examiner* — Adam D Rogers
(74) *Attorney, Agent, or Firm* — General Electric Company; Pamela A. Kachur

(57) ABSTRACT

A gearbox vent apparatus includes: a gearbox; an accessory contained in a case mounted to the gearbox such than an interior space of the case communicates with an interior space of the gearbox, wherein the case includes a sidewall and an endwall, a hollow drive shaft mounted for rotation inside the case; an annular first seal element mounted to the drive shaft; an annular second seal element mounted to the case and contacting the first seal element so as to define a sealing interface; and a vent tube having a forward end coupled to the endwall in fluid communication with the drive shaft.

15 Claims, 2 Drawing Sheets

(51) Int. Cl.
*F02C 7/32* (2006.01)
*F16H 57/027* (2012.01)
*F16H 57/029* (2012.01)

(52) U.S. Cl.
CPC ..... *F16H 57/0456* (2013.01); *F16H 57/0472* (2013.01); *F05D 2260/605* (2013.01); *F05D 2260/608* (2013.01)

(56) References Cited

U.S. PATENT DOCUMENTS

| | | | | |
|---|---|---|---|---|
| 7,993,425 B2 * | 8/2011 | Corattiyil | ............... | B01D 45/14 138/89 |
| 8,013,488 B2 | 9/2011 | Berenger et al. | | |
| 8,714,905 B2 * | 5/2014 | Fintescu | ................. | F01D 25/16 415/1 |
| 8,821,332 B2 * | 9/2014 | Kawamura | ........... | F16H 57/027 464/17 |
| 8,876,933 B2 * | 11/2014 | Short | ..................... | F01M 13/04 415/115 |
| 8,893,744 B2 * | 11/2014 | Sigmund | ............... | F16H 57/027 137/351 |
| 9,028,576 B2 * | 5/2015 | Slayter | ................... | F01D 25/18 55/400 |
| 9,650,964 B2 * | 5/2017 | Huang | ....................... | F02C 7/26 |
| 2011/0203293 A1 | 8/2011 | Glahn | | |
| 2012/0159964 A1 | 6/2012 | Huang et al. | | |
| 2013/0112029 A1 | 5/2013 | Slayter et al. | | |

OTHER PUBLICATIONS

Unofficial English translation of Office Action issued in connection with corresponding JP Application No. 2015-238248 dated Nov. 8, 2016.

* cited by examiner

GEARBOX WITH SEALED ACCESSORY VENT

CROSS-REFERENCE TO RELATED APPLICATIONS

This non-provisional application claims the benefit of priority under 35 U.S.C. § 119(e) to U.S. Provisional Patent Application No. 62/089,025, entitled "GEARBOX WITH SEALED ACCESSORY VENT", filed Dec. 8, 2014, which is herein incorporated in its entirety by reference.

BACKGROUND OF THE INVENTION

This invention relates generally to gas turbine engines and more particularly to apparatus for venting gear boxes in gas turbine engines.

A gas turbine engine usually includes one or more mechanically-driven accessories, such as fuel or oil pumps, generators or alternators, control units, and the like. Such accessories are mounted to an accessory gearbox ("AGB") which extracts torque from the engine, and drives each accessory at the required rotational speed, using an internal gear train.

Pressurized oil flow is delivered to the AGB for lubrication and cooling. The spent oil from the AGB drains back to a supply and scavenging system of the engine. In a typical configuration, one or more engine sumps are vented through a rotating air-oil separator located on the alternator drive shaft in the AGB. The separated air-oil mixture exits the hollow shaft and enters the vent line which extends from the aft end of the alternator cover.

In prior art engines, the vent line extends in a downhill direction. In such engines, the control of the air-oil mixture relative to potential flooding of internal components is not as critical, because any oil that leaks past internal seals or condenses out of the vent air between the drive shaft and the vent will flow through the downhill vent tube located toward the bottom of the alternator housing, intrinsically limiting the potential amount of oil that might flood the alternator or other AGB components. However, some engine configurations have a vent which must exit the alternator in an uphill direction, which can put the alternator at risk of flooding with oil.

Accordingly, there remains a need for an alternator vent which is not sensitive to the direction of vent air flow.

BRIEF SUMMARY OF THE INVENTION

This need is addressed by the present invention, which provides a gearbox with an accessory having a sealed vent apparatus which prevents oil from leaking back into the accessory.

According to one aspect of the invention, a gearbox vent apparatus includes: a gearbox; an accessory contained in a case mounted to the gearbox such than an interior space of the case communicates with an interior space of the gearbox, wherein the case includes a sidewall and an endwall, a hollow drive shaft mounted for rotation inside the case; an annular first seal element mounted to the drive shaft; an annular second seal element mounted to the case and contacting the first seal element so as to define a sealing interface; and a vent tube having a forward end coupled to the endwall in fluid communication with the drive shaft.

According to another aspect of the invention, the stator includes at least one drain channel formed therein, interconnecting the interior spaces of the case and the gearbox.

According to another aspect of the invention, the accessory is an alternator including an annular rotor mounted to the drive shaft, surrounded by an annular stator mounted in the case.

According to another aspect of the invention, the sidewall of the case incorporates an oil nozzle oriented to discharge oil radially inward into the interior space of the case, towards the first and second seal elements.

According to another aspect of the invention, the oil nozzle communicates with a channel in the case which in turn communicates with an oil gallery in the gearbox.

According to another aspect of the invention, the alternator is a permanent magnet alternator.

According to another aspect of the invention, the at least one drain channel is formed in the stator of the alternator.

According to another aspect of the invention, the rotor abuts a shoulder formed on an outer surface of the drive shaft and is retained in position against the rotor by a locking nut engaged with the drive shaft.

According to another aspect of the invention, at least one of the first and second seal elements comprises carbon graphite material.

According to another aspect of the invention, the second seal element comprises carbon graphite material and the first seal element is a different material.

According to another aspect of the invention, an overboard tube is coupled to an aft end of the vent tube.

According to another aspect of the invention, A gas turbine engine is provided combination with the gearbox vent apparatus, wherein the gearbox vent apparatus is mounted to a lower portion of the engine.

According to another aspect of the invention, the gas turbine engine further includes an air-oil separator connected in fluid communication with the hollow drive shaft.

According to another aspect of the invention, the gas turbine engine further includes an overboard tube coupled to an aft end of the vent tube.

According to another aspect of the invention, the overboard tube extends towards a centerline axis of the engine.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
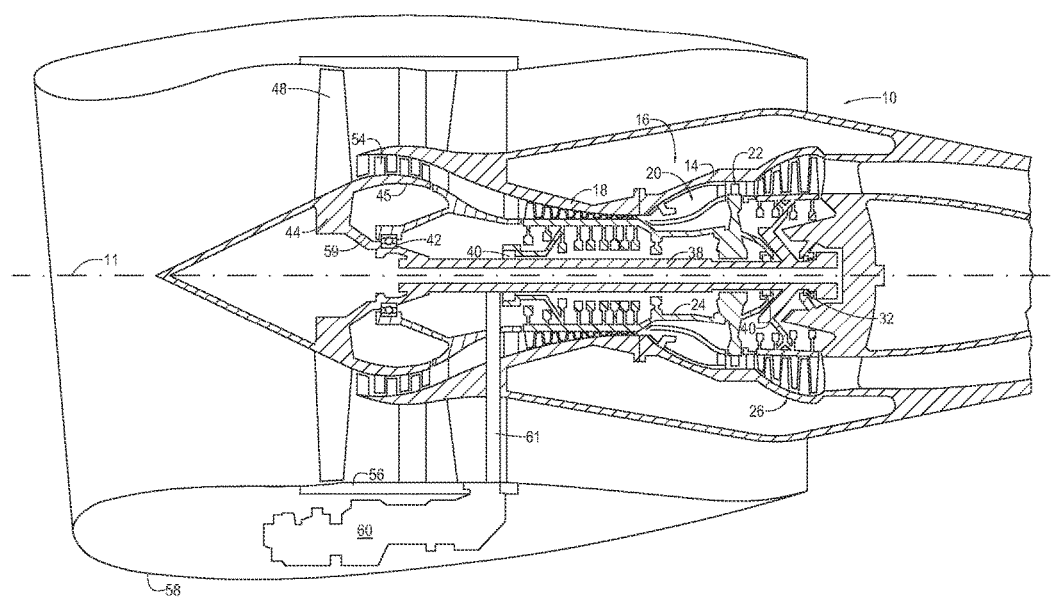
FIG. 1 is a schematic, cross-sectional view of a gas turbine engine incorporating a sealed alternator vent constructed in accordance with an aspect of the present invention.

Referring to the drawings wherein identical reference numerals denote the same elements throughout the various views, FIG. 1 illustrates a gas turbine engine, generally designated 10, in which is incorporated a gearbox and sealed accessory vent constructed according to the principles of the present invention. The engine 10 has a longitudinal centerline axis 11 and an outer stationary annular casing 14 disposed coaxially along the axis 11. The engine 10 includes a gas generator core 16 which is composed of a multi-stage compressor 18, a combustor 20, and a high pressure turbine 22, either single or multiple stage, all arranged coaxially about the centerline axis 11 in a serial, axial flow relationship. An annular outer drive shaft 24 interconnects the compressor 18 and high pressure turbine 22.

In operation, pressurized air from the compressor 18 is mixed with fuel in the combustor 20 and ignited, thereby generating combustion gases. Some work is extracted from these gases by the high pressure turbine 22 which drives the compressor 18. The remainder of the combustion gases are discharged from the core 16 into a low pressure turbine 26.

An inner drive shaft 38 is mounted for rotation relative to the outer drive shaft 24 via rear bearings 32, differential bearings 40, and via suitable forward bearings 42 interconnected to the outer stationary casing 14. The inner drive shaft 38 is driven by the low pressure turbine 26 and drives a forward fan shaft 59, which in turn drives a forward fan rotor 44 and, in some cases, a booster rotor 45. The fan blades 48 and booster blades 54 are mounted to the fan rotor 44 and booster rotor 45 for rotation therewith. The fan blades 48 are surrounded by an annular fan casing 56 which is in turn surrounded by an annular fan nacelle 58.

The engine 10 has an accessory gearbox ("AGB") 60 mounted to it. In the illustrated example, the AGB 60 is mounted at the bottom of the engine 10, below the fan casing 56, at a 6 o'clock position (as viewed from forward or aft of the engine 10). Various shaft-driven engine accessories, such as oil and fuel pumps, starters, generators, alternators, etc. may be mounted to the AGB 60. In operation, torque from the engine core 16 is transferred to the AGB 60 via an internal and/or transfer gearbox 61, shown schematically in FIG. 1. The torque thereby supplied to the AGB 60 is then used to drive each of the individual, shaft-driven accessories, in a known manner.

Figure 2:
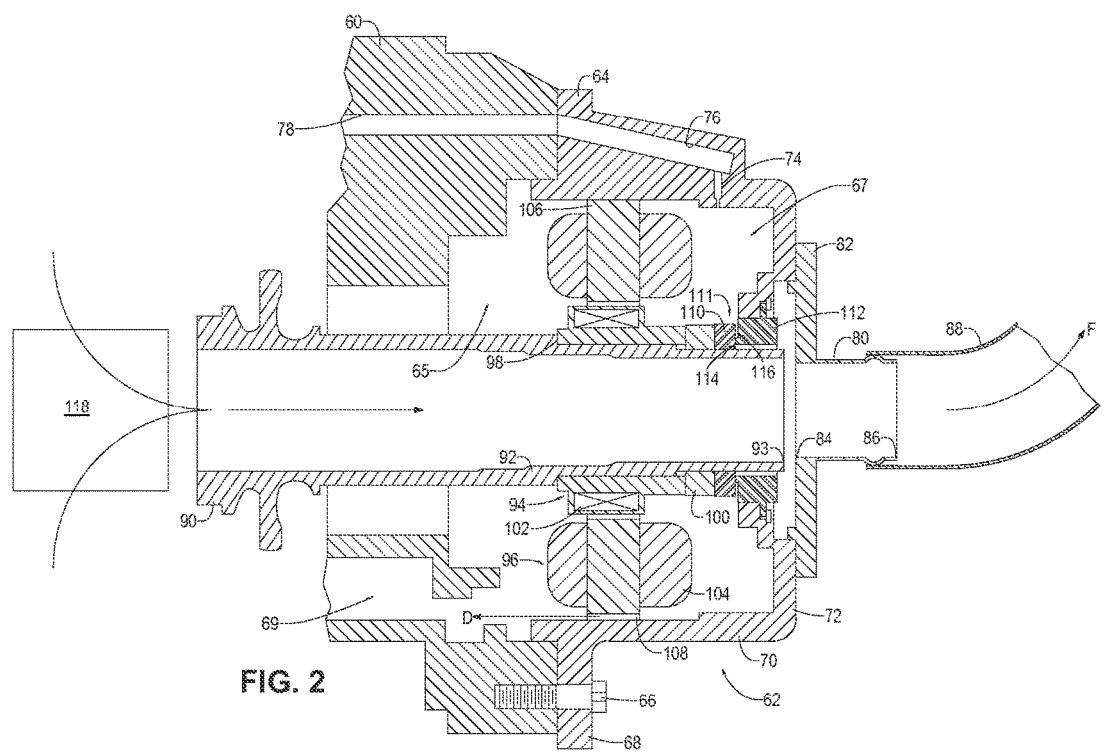
FIG. 2 is a cross-sectional view of a portion of the engine of FIG. 1.

Referring to FIG. 2, an alternator 62 is mounted to the AGB 60. The alternator 62 includes a hollow alternator case 64 which is mounted to the AGB 60, for example using bolts 66 passing through flanges 68 of the alternator case 64 and into the AGB 60. The interior spaces 65 and 67 of the alternator case 64 communicate with the interior space 69 of the AGB 60. The alternator case 64 includes a peripheral sidewall 70 joined to an aft-facing endwall 72. The sidewall 70 incorporates an oil nozzle 74 which is oriented to discharge oil radially inward into the interior space 67 of the alternator case 64, for cooling and lubrication. The oil nozzle 74 is supplied by a channel 76 in the alternator case 64 which in turn communicates with an oil gallery 78 in the AGB 60. It is noted that the alternator 62 is used merely as an example, and the principles of the present invention are applicable to any engine-driven accessory which must accommodate a vent flow while avoiding being flooded with excess oil.

A vent tube 80 is mounted to the endwall 72 of the alternator case 64 by a flange 82. The forward end 84 of the vent tube 80 passes through the endwall 72 and is therefore in fluid communication with the interior space 67 of the alternator case 64 and the aft end 86 of the vent tube 80 communicates with an overboard tube 88, a portion of which is shown in FIG. 2. It is noted that directional terms such as "forward" and "aft" are used herein solely for the purpose of convenience in description and do not imply that any particular orientation of the components described is required. In the illustrated example the overboard tube 88 is shown extending in a generally uphill direction, which is towards the centerline 11 of the engine 10.

A hollow alternator drive shaft 90 is mounted for rotation within the AGB 60. The aft portion 92 of the alternator drive shaft 90 is located in the alternator case 64, positioned co-axial to the vent tube 80. The aft end 93 of the alternator drive shaft 90 terminates near the endwall 72, a small axial distance away from the forward end 84 of the vent tube 80 and flange 82.

The alternator 62 includes a rotor 94 and a stator 96. The rotor 94 is generally cylindrical and is mounted to the outer diameter of the alternator drive shaft 90. The forward end of the rotor 94 abuts a shoulder 98 formed in the alternator drive shaft 90. A locking nut 100 abuts the aft end of the rotor 94 and maintains the rotor 94 in position against the shoulder 98. In the illustrated example the alternator 62 is a permanent magnet alternator or "PMA". The rotor 94 carries a ring of permanent magnets 102 mounted around its periphery. The stator 96 includes one or more field coils 104 wound on a stator frame 106. The alternator 62 operates in known fashion to generate an alternating current in the field coils when the rotor 94 is rotating. The field coils 104 are in turn coupled by leads to one or more electrical loads (not shown). Channels 108 are provided in the outer periphery of the stator 96 which interconnect interior spaces 65 and 67 of the alternator case 64 and the interior space 69 of AGB 60 and permit oil to drain, as described in more detail below.

An annular first seal element 110 is mounted to the alternator drive shaft 90 adjacent the locking nut 100. An annular second seal element 112 is mounted in the endwall 72, surrounding the alternator drive shaft 90. End faces 114, 116 of the first and second seal elements 110 and 112, respectively, bear against each other to define a sealing interface. Collectively the two seal elements constitute "a seal", denoted 111. In the illustrated example, the second seal element 112 is made from carbon graphite material, while the first seal element 110 may be made from any of a variety of materials required to meet seal performance requirements. Such seals are commercially available and referred to commonly as "carbon seals." Other known types of rotating seals may be substituted for this sealing function.

In operation, the alternator drive shaft 90 rotates, turning the rotor 94 and generating electric current. Simultaneously a flow of exhaust air "F" from an upstream air-oil separator of a known type (shown schematically at 118) containing residual oil vapor flows aft through the hollow interior of the alternator drive shaft 90, subsequently passing into the vent tube 80 and then the overboard tube 88. The seal 111 prevents any air-oil mixture within the aft interior space 67 of the alternator 64 from joining with exhaust flow F through the gap between the aft end 93 of the alternator drive shaft 90 and the vent tube 80, thereby bypassing the air-oil separator 118.

Simultaneously, oil is discharged from the oil nozzle 74 towards the first seal element 110, providing cooling and lubrication thereto. The action of the seal 111 prevents the oil from entering the alternator drive shaft 90. As shown by the arrow "D", spent oil either from the oil nozzle 74 or condensed from the air-oil mixture within the aft interior space 67 of the alternator 64 drops to the bottom of the alternator case 64, passes through the channels 108 into the interior space 65 and then into the interior space 69 of the AGB 60 where it can be drained away or otherwise scavenged.

The sealed venting arrangement described herein provides effective venting of the air-oil separator exhaust while also preventing flooding of the alternator 62 with oil. Unlike prior art designs, it is not dependent upon a particular direction of vent flow, and the overboard tube 88 can extend in any direction. In particular, it can be directed upwards towards the centerline 11 of the engine, as illustrated in FIG.

2, without affecting its performance. This design minimizes oil consumption and maintains sump pressurization system performance.

The foregoing has described an engine vent apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A gearbox assembly comprising:
   a gearbox;
   a hollow case mounted to the gearbox such that an interior space of the case communicates with an interior space of the gearbox, wherein the case includes a sidewall and an endwall;
   an accessory contained in the case;
   a hollow drive shaft mounted for rotation inside the case;
   an annular first seal element mounted to the drive shaft;
   an annular second seal element mounted to the case and contacting the first seal element so as to define a sealing interface; and
   a vent tube having a forward end coupled to the endwall in communication with the drive shaft.

2. The assembly of claim 1, wherein the accessory comprises an alternator including an annular rotor mounted to the drive shaft, surrounded by an annular stator mounted in the case.

3. The assembly of claim 2, wherein the alternator is a permanent magnet alternator.

4. The assembly of claim 2, wherein the rotor abuts a shoulder formed on an outer surface of the drive shaft and is retained in position against the rotor by a locking nut engaged with the drive shaft.

5. The assembly of claim 2, wherein the stator includes at least one drain channel formed therein, interconnecting the interior spaces of the case and the gearbox.

6. The assembly of claim 5, wherein the at least one drain channel in formed in the stator of the alternator.

7. The assembly of claim 1, wherein the sidewall of the case incorporates an oil nozzle oriented to discharge oil radially inward into the interior space of the case, towards the first and second seal elements.

8. The assembly of claim 7, wherein the oil nozzle communicates with a channel in the case which in turn communicates with an oil gallery in the gearbox.

9. The assembly of claim 1, wherein at least one of the first and second seal elements comprises carbon graphite material.

10. The assembly of claim 9, wherein the second seal element comprises carbon graphite material and the first seal element is a different material.

11. The assembly of claim 1, wherein an overboard tube is coupled to an aft end of the vent tube.

12. A gas turbine engine in combination with the gearbox vent apparatus of claim 1, wherein the gearbox vent apparatus is mounted to a lower portion of the gas turbine engine.

13. The gas turbine engine of claim 12, further including an air-oil separator connected in communication with the hollow drive shaft.

14. The gas turbine engine of claim 12, further including an overboard tube coupled to an aft end of the vent tube.

15. The gas turbine engine of claim 14, wherein the overboard tube extends towards a centerline axis of the gas turbine engine.

* * * * *